United States Patent [19]

Curatolo et al.

[11] Patent Number: 4,629,776
[45] Date of Patent: Dec. 16, 1986

[54] PROCESS FOR THE PREPARATION OF POLYAMIDE FROM OMEGA-AMINONITRILE UTILIZING AN OXYGENATED SULFUR COMPOUND AS CATALYST

[75] Inventors: Benedict S. Curatolo, Maple Heights; Robert C. Sentman, Macedonia; Gerald P. Coffey, Lyndhurst, all of Ohio

[73] Assignee: The Standard Oil Company, Cleveland, Ohio

[21] Appl. No.: 809,601

[22] Filed: Dec. 16, 1985

[51] Int. Cl.$^4$ .............................................. C08G 69/00
[52] U.S. Cl. ................................... 528/313; 528/206; 528/207; 528/208; 528/310
[58] Field of Search ............... 528/313, 310, 206, 207, 528/208

[56] References Cited

U.S. PATENT DOCUMENTS 4,568,736  2/1986  Curatolo et al. ..................... 528/313

*Primary Examiner*—Harold D. Anderson
*Attorney, Agent, or Firm*—David P. Yusko; John E. Miller; Larry W. Evans

[57] ABSTRACT

A catalytic process for the production of high molecular weight nylon-type polyamides from omega-aminonitriles has been discovered. The process comprises contacting an omega-aminonitrile, water and a catalytic amount of an oxygenated sulfur compound catalyst. In one embodiment, sulfuric acid is utilized to polymerize 6-aminocapronitrile to nylon-6, at an elevated temperature and pressure.

16 Claims, No Drawings

PROCESS FOR THE PREPARATION OF POLYAMIDE FROM OMEGA-AMINONITRILE UTILIZING AN OXYGENATED SULFUR COMPOUND AS CATALYST

FIELD OF THE INVENTION

This invention relates to polyamides. More specifically, this invention relates to a catalytic process for the preparation of high molecular weight, thermally stable polyamides from omega-aminonitriles and water. This process utilizes an oxygenated sulfur compound as a catalyst. In a preferred embodiment, this invention relates to the production of nylon-6 from 6-aminocapronitrile and water using an oxygenated sulfur compound as the catalyst.

DESCRIPTION OF THE PRIOR ART

It is known in the art that commercially available nylons may be prepared by polymerization of various monomers and combinations of monomers. For example various nylons may be prepared from the polymerization of diamines with dicarboxylic acids, the polymerization of dinitriles with diamines in the presence of water or the polymerization of lactams.

In part, the instant invention deals with nylons resulting from the polymerization of omega-aminonitriles. In U.S. Pat. No. 2,245,129 by Greenwalt, a method for producing a linear polyamide by heating an aminonitrile and water is described. The Greenwalt procedure consists of two stages. In the first stage the reaction mixture is heated in a closed reaction vessel until a low molecular weight polyamide is formed while in the second stage, this low molecular weight polyamide is converted to a high molecular weight polyamide upon additional heating.

In part, the instant invention also relates to the use of an oxygenated sulfur compound as a catalyst in a process for the polymerization of omega-aminonitriles. Recently, Curatolo et al. U.S. application Ser. No. 650,944 now U.S. Pat. No. 4,568,736, disclosed a similar process which utilized an oxygenated phosphorus compound as the polymerization catalyst.

Lastly, the instant invention relates to the production of nylon-6 from 6-aminocapronitrile. It has been recently reported, in EPC Application 7791, assigned to Allied Chemical Corporation of Morristown, N.J., that 6-aminocapronitrile may be selectively produced from adiponitrile by catalytic hydrogenation using a ruthenium catalyst on a basic support in the presence of ammonia, and subsequently cyclized to caprolactam which may be then polymerized to nylon-6. It is an objective of the process of the instant invention to produce high molecular weight nylon-6 directly from 6-aminocapronitrile without the intermediate isolation of 6-caprolactam.

SUMMARY OF THE INVENTION

Nylon-type polyamides suitable for fibers, plastics, films and molding compounds are produced in a process comprising contacting at an elevated temperature an omega-aminonitrile, water and an oxygenated sulfur compound catalyst. In one embodiment, nylon-6 is produced by contacting 6-aminocapronitrile, water and an oxygenated sulfur compound catalyst.

DETAILED DESCRIPTION OF THE INVENTION

The Monomer:

Any aminonitrile or combination of aminonitriles may be polymerized in this invention. Preferred are the omega-aminonitriles of the formula

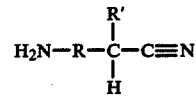

where R is a divalent organic radical and R' is hydrogen or a univalent organic radical. R can be a divalent aliphatic, alicyclic or aromatic radical and these radicals can bear one or more inert substituents. Similarly, R' can be a hydrogen or a univalent aliphatic, alicyclic or aromatic radical and these radicals can also bear one or more inert substituents. By the term "inert" is meant that the substituent is essentially non-reactive with the reactants, catalysts and products of the process under process conditions. Typically, R is a divalent $C_1$-$C_{20}$ aliphatic radical, a divalent $C_5$-$C_{18}$ alicyclic radical or a divalent benzene radical and preferably R is a $C_2$-$C_8$ straight chain alkylene radical. Typically, R' is hydrogen or a $C_1$-$C_{20}$ aliphatic radical, $C_5$-$C_7$ alicyclic or a phenyl radical. Preferably, R' is hydrogen or a $C_1$-$C_4$ alkyl radical.

Representative aminonitriles include 6-aminocapronitrile, 3-aminopropionitrile, and 4-cyanoaniline as well as the following:

$H_2N-(CH_2)_7-CN$
$H_2N-(CH_2)_{16}-CN$
$H_2N-(CH_2)_2-CHCH_3-(CH_2)_2-CN$
$H_3CHN-(CH_2)_6-CN$
$CH_3-CHNH_2-(CH_2)_8-CN$
$CH_3-CH\ NH_2-CH_2-C(CH_3)_2-CH_2-CH_2-CN$
$H_2N-C_6H_{10}-CN(1,4)$
$H_2N-CH_2-C_6H_4-CN$
$H_2N-CH_2-C_6H_4-CH_2CN$
$H_2N-(CH_2)_3-O-(CH_2)_2-CN$
$H_2N-(CH_2)_4-S-(CH_2)_3-CN$ and
$H_2N-CH_2-C_6H_4-O-C_6H_4-CN$.

Additionally, the instant invention is equally suited for the production of copolymers of aminonitriles with other polyamide forming monomers or polyamide forming monomer pairs such as dinitriles and dimaines, diacids and diamines, aminoacids or lactams.

The Catalyst:

The oxygen-containing sulfur compounds suitable for use as catalyst in the invention include sulfuric acid, sulfurous acid, sulfur dioxide, sulfur trioxide, alkyl and aryl substituted sulfonic acid, alkyl and aryl substituted sulfinic acid and alkyl and aryl substituted sulfenic acid; as well as the alkyl, aryl, and alkyl/aryl esters, metal salts, ammonium salts, and ammonium alkyl salts of these various sulfur-containing compounds. The esters are formed conventionally with the alkyl or aryl group replacing the hydrogen of an —OH group comprising the acid. Sulfoxides, sulfones, sulfates, pyrosulfates, sulfites, pyrosulfites, sulfonates and sulfinates are included in the oxygenated sulfur compounds suitable for use as catalyst in the invention.

In order to clarify some of the compounds named above, the structures of several of the oxygenated sulfur compounds are:

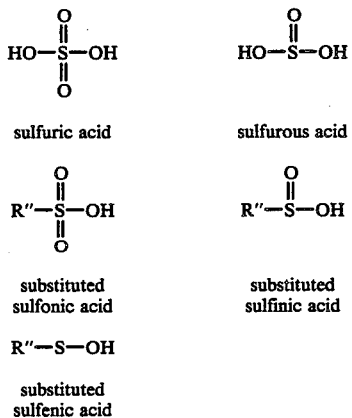

sulfuric acid     sulfurous acid substituted sulfonic acid     substituted sulfinic acid substituted sulfenic acid where each R" is independently an alkyl or aryl radical.

Preferred oxygen-containing sulfur compounds are sulfuric acid, p-toluenesulfonic acid, and the sodium or lithium salts of sulfuric or p-toluenesulfonic acids. These salts may be added initially or generated in situ by the addition of NaOH or LiOH to a reaction mixture already containing the oxygenated sulfur compound at a time late in the reaction cycle.

Sufficient catalyst is employed to promote the polymerization of the omega-aminonitrile. A typical amount of catalyst suitable for the process is between 0.001 and 1 weight percent, based upon the total weight of the aminonitrile and water. Catalyst levels of about 0.01 to about 1 weight percent are preferred.

Process Parameters:

High molecular weight, linear polyamides are prepared by forming a reaction mixture of the aminonitrile, water and catalyst. This reaction mixture can be formed by any one of a number of different methods. One method is the gradual addition, either continuously or incrementally, of the aminonitrile over the course of the hydrolysis portion of the reaction (polymerization). Typically, in this method less than 50 mole percent of the aminonitrile, preferably less than 5 mole percent, is initially present with the remainder of the aminonitrile added gradually over the course of polymerization. Another method and one preferred due to its simplicity of operation is a batch addition of all monomers and catalyst at the commencement of the reaction.

The reaction itself is preferably conducted in a batch mode. However, the reaction can also be conducted in a continuous mode, i.e. continual addition of the aminonitrile and catalyst with concomitant removal of product, if desired. An example of a continuous mode process is the use of a cascade reactor arrangement.

Water is necessary to the process as both a reactant and as an aid in formation of the polyamide. Consequently, a stoichiometric excess of water is typically employed during the polymerization. This does not mean a stoichiometric excess of water is present at all times during polymerization, it instead means that the total amount of water consumed by the polymerization plus the amount of water remaining at the end of polymerization is in excess of the amount of water required for full polymerization of the monomers. Preferably the initial water content of the reaction mixture does not exceed about 50 weight percent of the total weight of the reaction mixture, more preferably it does not exceed 30 weight percent. A typical polymerization might employ less than or about 20 weight percent water at the start of the reaction, then as the polymerization proceeds additional water is gradually added to the reaction mixture until water constitutes about 40 weight percent of the mixture. Although it is not desired, more water can be used. However, since the water will have to be removed from the reaction product at the end of the polymerization, preferably the amount of excess water is kept to a minimum (typically 30 weight percent or less) to facilitate ultimate removal. Moreover, the less water present during the polymerization generally means the less energy needed for the process and consequently, less expensive process equipment can be employed. The manner in which the water is initially introduced into the reaction mixture is not important to the practice of this invention and it can thus be either added alone or in combination with the aminonitrile.

Ammonia is a byproduct of the reaction of the aminonitrile and water. As a consequence, ammonia is constantly being generated within the reaction mixture. This ammonia typically enters the vapor phase and is preferably continuously removed from reaction zone (e.g. released through a pressure relief valve on the reaction vessel). The concentration of ammonia in the reaction mixture (which is a liquid) can vary from threshold detection limits up to about 5 weight percent of the total weight of the reaction mixture. Preferably, the concentration of ammonia in the liquid reaction mixture does not exceed 1 weight percent and more preferably, is kept as low as possible.

In one embodiment of this invention, high quality nylon-6 resin is prepared from 6-aminocapronitrile and water by continuously removing substantially all of the ammonia generated during the polymerization but while retaining all of the water. The water is eventually removed from the reaction system after the low molecular weight polyamides are formed, i.e. the hydrolysis of the aminonitrile is essentially complete as evidenced, for example, by the amount of ammonia that has evolved since the start of the reaction.

The polymerization of aminonitrile to form a high molecular weight, linear polyamide is best conducted over a temperature/pressure profile that varies over the course of the polymerization. The temperature/pressure profile will, of course, vary with the specific aminonitrile employed as well as with such factors as the nature and amount of catalysts, mode of operation (batch versus continuous), configuration of the reaction vessel, etc. For the manufacture of nylon-6 from an aminonitrile and water, a temperature/pressure profile comprising at least two stages is typically employed, both preferably conducted in the absence of oxygen. During the first stage of the polymerization, the temperature is maintained at 200°–300° C., preferably 240°–270° C., under autogenous pressure (typically in the range of about 200 to about 800 psig) for a period of time sufficient to form low molecular weight polyamides, e.g. polyamides having a weight average molecular weight of less than about 10,000, generally less than about 5,000 as measured by intrinsic viscosity. Ammonia is removed from the reaction vessel while maintaining the water concentration at a level sufficient for polymerization to proceed, typically in excess of 14 weight percent. At the completion of the first stage (which is the start of the second stage), the pressure is gradually reduced to atmospheric or subatmospheric pressure and the temperature is gradually increased, preferably to between about 260°–295° C. During this second stage, relatively low molecular weight polyamides are combined to form the high molecular weight polyamides that constitute the final product of the process. The second stage is typically concluded with a sweep or purge of the reaction vessel with a flow of inert gas, such as nitrogen.

In one embodiment of this invention, the molecular weight of the polyamide can be increased by performing the polymerization at a temperature just below the lowest temperature at which either the catalyst, monomers or final polyamide begin to degrade.

Although the polymerization is initially conducted at autogenous pressure with a later reduction to atmospheric or subatmospheric pressure, the process can be conducted at constant pressure by applying an inert gas pressure to the system and adjusting this pressure as the reaction proceeds. The pressure can be maintained with a gaseous reactant or a gas inert to the reaction or some combination of the two. However, since the reaction itself is conducted in the liquid phase, the presence of a gaseous reactant is for the purpose of maintaining reaction pressure, not for participating in the polymerization.

The Polyamide:

The polyamides produced by this invention have a nylon structure, i.e. the polymer contains amide linkages (—CONH—) as an integral part of the polymer backbone, as opposed to polyacrylamides which have an essentially all carbon backbone. These polyamides are solid polymeric materials which can be used in any application calling for the use of a nylon-type polymer. For example, these polyamides can be used as fibers, plastics, films or molding compounds.

This invention is particularly well adapted to manufacturing high quality nylon-6 from 6-aminocapronitrile and water. Such a process would be an alternative to present commercial processes which produce nylon-6 from 6-caprolactam.

SPECIFIC EMBODIMENTS

The following examples are provided in order to illustrate the instant invention.

EXAMPLES 1-4

Polymerization of 6-Aminocapronitrile

Table I describes several polymerizations using 6-aminocapronitrile which were conducted using the following procedures. Into a 450 ml. Parr autoclave were placed 100 g (0.89 moles) of 6-aminocapronitrile, water and catalyst. The autoclave was then sealed and purged three times with nitrogen. The autoclave was then heated to 250° C. or 260° C. and held at that temperature for 3.5 hours. During this time pressure in the reactor was not allowed to exceed 750 psig. After the 3.5 hours the temperature was increased to or held at 260° C., while the pressure was slowly reduced over a 30 minute period to 0 psig. The autoclave was then purged with nitrogen again and allowed to cool under additional nitrogen purging. The product was identified as nylon-6.

Nylon-6 polymer was recovered from the reactor and ground to a size such that it would pass through a ten mesh (U.S. Standard) screen. Melting point and onset decomposition temperature (ODT) was measured by differential scanning calorimetry (DSC). Weight loss was measured by thermal gravimetric analysis (TGA). Intrinsic viscosity was determined in formic acid (90 weight percent) at 25° C. Percent water insolubility was determined for 5.00 grams of product in 150 grams of boiling water for 60 minutes. Intrinsic viscosity, TGA weight loss and DSC onset decomposition temperature measurements were performed on the water-insoluble portions of the products.

TABLE I

The Polymerization of 6-Aminocapronitrile to Nylon-6 Utilizing an Oxygenated Sulfur Compound as Catalyst

| Experiment Number | Catalyst | Catalyst Concentration (mole %) | wt. % Water | Temperature (°C.) | Intrinsic Viscosity* (dl/g) | TGA % weight loss (325-390° C.) | DSC Onset Decomposition Temp (°C.) | % Water Insolubility |
|---|---|---|---|---|---|---|---|---|
| 1 | none | — | 23 | 250 | 0.11 | 7.4 | 320 | 74.8 |
| 2 | H$_2$SO$_4$ | 0.146 | 23 | 250 | 0.31 | 6.1 | 350 | 90.2 |
| 3 | none | — | 40 | 260 | 0.56 | 5.5 | 370 | 90.6 |
| 4 | H$_2$SO$_4$ | 0.292 | 40 | 260 | 0.72 | 3.7 | 380 | 92.6 |

Since viscosity is proportional to molecular weight, Table I illustrates that polyamides produced from omega-aminonitriles using the catalytic process of the instant invention have greater viscosities and consequently greater molecular weight than polyamides produced using an identical process without a catalyst.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

The claimed invention is:

1. A process for the production of a polyamide comprising contacting, at an elevated temperature, at least one omega-aminonitrile, water and a catalytic amount of an oxygen containing sulfur compound.

2. The process of claim 1, wherein the catalyst is at least one of sulfuric acid; sulfurous acid; sulfur dioxide; sulfur trioxide; alkyl or aryl substituted sulfonic acid; alkyl or aryl substituted sulfinic acid; alkyl or aryl substituted sulfenic acid; or an alkyl, aryl or alkyl/aryl ester, metal salt, ammonium salt or ammonium alkyl salt of sulfuric acid, sulfurous acid, sulfonic acid, sulfinic acid or sulfenic acid.

3. The process of claim 2, wherein the catalyst is selected from the group consisting of sulfuric acid, p-toluenesulfonic acid and the sodium or lithium salt of sulfuric acid or p-toluenesulfonic acid.

4. The process of claim 3, wherein the catalyst is selected from the group consisting of the sodium or lithium salt of sulfuric acid or p-toluenesulfonic acid and is generated in situ after the start of the process by the addition of NaOH, LiOH or a combination thereof to sulfuric acid or p-toluenesulfonic acid.

5. The process of claim 1, wherein the amount of catalyst employed in the process is between 0.001 wt. percent and 1.0 wt. percent of the total weight of the omega-aminonitrile and water.

6. The process of claim 5, wherein the amount of catalyst employed in the process is between 0.01 wt. percent and 1.0 wt. percent of the total weight of the omega-aminonitrile and water.

7. The process of claim 1, wherein the omega-aminonitrile is of the formula:

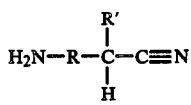

wherein R is a divalent organic radical and R' is hydrogen or a univalent organic radical.

8. The process of claim 7, wherein R is a divalent aliphatic radical or inertly substituted derivative thereof, a divalent alicyclic radical or inertly substituted derivative thereof, or divalent aromatic radical or inertly substituted derivative thereof and R' is hydrogen, a univalent aliphatic radical or inertly substituted derivative thereof, a univalent alicyclic radical or inertly substituted derivative thereof, or a univalent aromatic radical or inertly substituted derivative thereof.

9. The process of claim 8, wherein R is a divalent $C_1$ to $C_{20}$ aliphatic radical, a divalent $C_5$ to $C_{18}$ alicyclic radical or a divalent benzene radical and R' is hydrogen or a $C_1$ to $C_{20}$ aliphatic radical, a $C_5$ to $C_7$ alicyclic radical or a phenyl radical.

10. The process of claim 9, wherein R is a $C_2$ to $C_8$ straight chain alkylene radical and R' is hydrogen or a $C_1$ to $C_4$ alkyl radical.

11. The process of claim 1, wherein the omega-aminonitrile is 6-aminocapronitrile.

12. The process of claim 1, wherein the omega-aminonitrile is copolymerized with polyamide forming monomers or polyamide forming monomer pairs.

13. The process of claim 12, wherein the omega-aminonitrile is copolymerized with polyamide forming monomers or polyamide forming monomer pairs selected from the group consisting of (1) dinitriles and diamines, (2) diacids and diamines, (3) amino-acids and (4) lactams.

14. The process of claim 1, wherein a stoichiometric excess of water is employed in the process.

15. The process of claim 1, wherein ammonia is continuously removed from the reaction vessel.

16. The process of claim 1, wherein polyamide is produced in a two stage process wherein the first stage comprises maintaining the process at a temperature between 200° to 300° C. and a pressure between 200 and 800 psig for a period of time sufficient to form low molecular weight polyamide, and wherein the second stage comprises maintaining the process at a temperature between 200° to 295° C. and gradually reducing the pressure to less than or equal to atmospheric pressure.

* * * * *